United States Patent
Lee

(10) Patent No.: US 6,184,948 B1
(45) Date of Patent: Feb. 6, 2001

(54) LIQUID CRYSTAL DISPLAY DEVICE HAVING A PLURALITY OF ERROR DETECTING SHORTING BARS AND A METHOD OF MANUFACTURING THE SAME

(75) Inventor: Sung Soo Lee, Kyunggi-do (KR)

(73) Assignee: LG Electronics Inc., Seoul (KR)

( * ) Notice: Under 35 U.S.C. 154(b), the term of this patent shall be extended for 0 days.

(21) Appl. No.: 09/005,587

(22) Filed: Jan. 12, 1998

(30) Foreign Application Priority Data

Feb. 11, 1997 (KR) .................................................. 97-4003

(51) Int. Cl.[7] .................... G02F 1/1333; G02F 1/136; G02F 1/13; G09G 3/36; H01L 31/00
(52) U.S. Cl. ................................ 349/54; 349/40; 349/42; 349/192; 345/92; 257/443
(58) Field of Search ....................... 349/40, 42, 54, 349/192, 46, 122, 138; 257/59, 72, 291, 208, 443; 345/92

(56) References Cited

U.S. PATENT DOCUMENTS

| | | | |
|---|---|---|---|
| 4,807,973 | * | 2/1989 | Kawasaki .............................. 350/332 |
| 5,504,348 | * | 4/1996 | Yoshida et al. ........................ 257/59 |
| 5,648,826 | * | 7/1997 | Song et al. ............................ 349/49 |
| 5,668,032 | * | 9/1997 | Holmberg et al. .................... 438/144 |
| 5,684,547 | * | 11/1997 | Park et al. ............................. 349/54 |
| 5,729,309 | * | 3/1998 | Na et al. ................................ 349/43 |
| 5,731,856 | * | 3/1998 | Kim et al. .............................. 349/43 |
| 5,751,020 | * | 5/1998 | Lyu ........................................ 257/72 |
| 5,767,929 | * | 6/1998 | Yachi et al. ............................ 349/40 |
| 5,852,480 | * | 12/1998 | Yajima et al. ......................... 349/40 |
| 5,883,682 | * | 3/1999 | Kim et al. .............................. 349/43 |
| 5,953,086 | * | 9/1999 | Oogiichi et al. ....................... 349/40 |
| 5,982,467 | * | 11/1999 | Lee ........................................ 349/138 |
| 6,005,647 | * | 12/1999 | Lim ....................................... 349/40 |
| 6,025,891 | * | 2/2000 | Kim ....................................... 349/40 |
| 6,038,003 | * | 3/2000 | Kim ....................................... 349/43 |
| 6,043,971 | * | 3/2000 | Song et al. ............................ 361/111 |
| 6,072,550 | * | 6/2000 | Kim ....................................... 349/40 |
| 6,081,308 | * | 6/2000 | Jeong et al. ........................... 349/42 |
| 6,088,072 | * | 7/2000 | Lee ........................................ 349/39 |
| 6,091,465 | * | 7/2000 | Lyu ........................................ 349/43 |

* cited by examiner

Primary Examiner—William L. Sikes
Assistant Examiner—Tarifur R. Chowdhury
(74) Attorney, Agent, or Firm—Morgan, Lewis & Bockius LLP

(57) ABSTRACT

A method for manufacturing a liquid crystal display device on a substrate including the steps of forming a gate electrode, a gate line, a gate pad, a source pad, a first gate shorting bar, and a first source shorting bar using a first metal; forming a gate insulation layer, a semiconductor layer, and a doped semiconductor layer by sequentially depositing an insulation material, an intrinsic semiconductor material, and a doped semiconductor material, respectively; and forming a source electrode, a source line, a drain electrode, a second gate shorting bar, and a second source shorting bar using a second metal.

15 Claims, 14 Drawing Sheets

LIQUID CRYSTAL DISPLAY DEVICE HAVING A PLURALITY OF ERROR DETECTING SHORTING BARS AND A METHOD OF MANUFACTURING THE SAME

This application claims the benefit of Korean Application No. P97-4003, filed in Korea on Feb. 11, 1997, which is hereby incorporated by reference.

BACKGROUND OF THE INVENTION

1. Field of the Invention

The present invention relates to an active matrix liquid crystal display (AMLCD) including an active panel with thin film transistors (TFT) and pixel electrodes arranged in a matrix pattern. More particularly, the present invention relates to a shorting bar for probing the active panel and a simplified method of integrally manufacturing the shorting bar on the same substrate as the other elements of the active panel.

2. Discussion of the Related Art

Within the field of display devices for displaying visual images on a screen, thin film type flat panel display devices are highly favored because of their light weight and easy adaptability. In light of these advantages, research activities have focused on the development of liquid crystal display devices because of their high resolution and fast response time suitable for display of motion picture images.

A liquid crystal display device operates through the polarization and optical anisotrophy of a liquid crystal. By controlling the orientation of rod-shaped liquid crystal molecules through polarization techniques, transmission and interception of light through the liquid crystal are achieved due to the anisotrophy of the liquid crystal. This principle is applied to the liquid crystal display device. AMLCDs having TFTs arranged in a matrix pattern and pixel electrodes connected to the TFTs provide high quality images and are now widely used. The structure of a conventional AMLCD will now be described.

An LCD generally has a color filter panel and an active panel. A first panel of an LCD, which is the color filter panel, includes a sequential arrangement of red, blue and green color filters on a transparent substrate at pixel positions designed in a matrix pattern. Among these color filters, black matrixes are formed in a lattice pattern. On the color filters, a common electrode is formed.

A second panel of an LCD, which is the active panel, includes pixel electrodes designed in a matrix pattern and formed on a transparent substrate. Along the column direction of the pixel electrodes, a plurality of scan bus lines are arrayed, and along the row direction of the pixel electrodes, a plurality of data bus lines are arrayed. At a corner of a pixel electrode, a TFT for driving the pixel electrode is formed. A gate electrode of each TFT is connected with a respective one of the plurality of scan bus lines (which are therefore also referred to as gate lines). A source electrode of each TFT is connected with a respective one of the plurality of data bus lines (which are therefore also referred to as source lines). Additionally, a gate pad is formed at the end portion of each of the plurality of gate lines, and a source pad is formed at the end portion of each of the plurality of source lines.

The color filter panel and the active panel are bonded together with a certain distance therebetween (i.e., a cell gap) to face each other. Liquid crystal material fills the cell gap to complete the liquid crystal panel of the LCD.

The method of manufacturing a liquid crystal display device is very complex and includes a number of processes combined together. The method of manufacturing an active panel having TFTs and pixel electrodes involves increased complexity. Moreover, if the active panel has a shorting bar for probing it, the manufacturing method can be even more complex. Therefore, it is important to simplify the method for manufacturing an active panel to reduce the possibility of defects during the manufacture process.

A conventional method for manufacturing an active panel having a shorting bar is described with reference to FIG. 1, which shows a plan view of an active panel, FIGS. 2a–2e show cross sectional views taken along line II—II of FIG. 1, FIGS. 3a–3e show the cross sectional views taken along line III—III of FIG. 1, and FIGS. 4a–4e show the cross sectional views taken along line IV–IV of FIG. 1.

As shown in FIGS. 1, 2a, 3a and 4a, an aluminum or an aluminum alloy is vacuum deposited on a transparent substrate 1 and patterned by using photolithography to form gate electrodes 11, gate lines 13, gate pads 15, source pads 25 and a shorting bar 45. The gate electrodes 11 are arrayed in a matrix pattern. The gate lines 13 connect gate electrodes 11 disposed in a column direction. A respective gate pad 15 is formed at the end of each respective gate line 13. A respective source pad 25 is formed at the end portion of each respective source line, which are to be formed later. The shorting bar 45 makes a connection between the gate pad 15 and the source pad 25, and surrounds the periphery of the substrate 1.

A hillock can easily grow at the surface of the aluminum, and this hillock can prevent adequate adhesion of another material to be deposited on the aluminum. Therefore, the aluminum surface must be anodized in order to prevent such a hillock on the aluminum surface. Using the shorting bar 45 as an anode for anodizing, the elements formed of aluminum (gate electrodes 11, gate line 13, gate pads 15, and source pads 25) are anodized to form an anodic oxide film 19 on their surface. Since the gate electrodes 11, the gate pads 15, the gate lines 13, and the source pads 25 are connected with the shorting bar 45, connection of the shorting bar 45 with an anode facilitates the anodizing of the elements.

The gate pad 15 and the source pad 25 are covered by a resin such as a photo resist, using photolithography in order to prevent the formation of an anodic oxide film on their surfaces. This is done because if an anodic oxide film 19 is formed on the surface of the gate pads 15 and the source pad 25, these pads will not receive the desired electrical data. Consequently, the gate electrode 11 has an anodic oxide film 19, as shown in FIG. 2a. The gate line 13 and the shorting bar 45 also have an anodic oxide film 19, but the gate pad 15 and the source pad 25 do not have an anodic oxide film, as shown in FIGS. 3a and 4a.

As shown in FIGS. 2b, 3b, and 4b, silicone oxide or silicone nitride is vacuum deposited on the substrate, including the gate electrodes 11, the gate lines 13, the gate pads 15, the source pads 25, and the shorting bar 45, to form a gate insulating layer 17. Then, a pure (intrinsic) semiconductor material and an impure (doped) semiconductor material are deposited sequentially and patterned by using photolithography to form a semiconductor layer 35 and an impure semiconductor layer 37.

As shown in FIGS. 3b and 4b, a first gate contact hole 51 on the gate pad 15 and a first source contact hole 61 on the source pad 25 are formed by using photolithography. Here, the contact holes 51 and 61 expose a portion of the gate pad 15 and a portion of the source pad 25, respectively, which are not anodized.

As shown in FIG. 2c, chromium (Cr) or a chromium alloy is vacuum deposited and patterned by using photolithography to form a source electrode 21, a drain electrode 31 and source lines 23 on the impure semiconductor layer 37. The exposed portion of the impure semiconductor 37 between the source electrode 21 and drain electrode 31 is removed by using the source electrode 21 and the drain electrode 31 as masks. In addition, chromium or a chromium alloy is also deposited on the gate pad 15 and source pad 25. The first source contact hole 61 connects the source line 23 with the source pad 25. Here, the chromium layer on the gate pad 15 connects the aluminum layer and a gate terminal (not shown), which is to be formed later, through the first gate contact hole 51 forming a gate pad intermediate electrode 55, as shown FIG. 3c. Similarly, the chromium layer on the source pad 25 protects the aluminum layer underneath and is used as a source pad intermediate electrode 65 to connect with a source terminal (not shown), which is to be formed later, as shown in FIG. 4c.

Next, as shown in FIGS. 2d, 3d and 4d, an insulating material, such as silicone oxide or silicone nitride, is vacuum deposited on the substrate, including the source electrode 21, the source lines 23, the drain electrode 31, the gate pad intermediate electrode 55, and the source pad intermediate electrode 65, to form a protection layer 41. The protection layer 41 is patterned by using a photo lithography to form a second gate contact hole 53 on the gate pad 15, a second source contact hole 63 on the source pad 25, and a drain contact hole 71 on the drain electrode 31. The second gate contact hole 53 exposes the gate pad intermediate electrode 55, and the second source contact hole 63 exposes the source pad intermediate electrode 65. The drain contact hole 71 exposes a portion of the drain electrode 31.

A section (labeled "A" in FIG. 1) of the shorting bar 45, which is made of aluminum and is connected to the gate pads 15 and the source pads 25, is removed to complete the final structure of the active panel by using photolithography. As a result, the shorting bar 45 is divided into two parts. The first part of the shorting bar 45 running along the row direction connects the source pads 25, and is thus referred to as a source shorting bar. The other part of the shorting bar 45 running along the column direction connects the gate pads 15, and is thus referred to as a gate shorting bar.

As shown in FIGS. 2e, 3e and 4e, indium-tin oxide (ITO) is vacuum deposited on the surface, including the protection layer 41, and is patterned by using photolithography to form pixel electrodes 33, gate terminals 57, and source terminals 67. Each gate terminal 57 is connected with a respective gate pad intermediate electrode 55 through a second gate contact hole 53, each source terminal 67 is connected with a respective source pad intermediate electrode 65 through a second source contact hole 63, and each drain electrode 31 is connected with a respective pixel electrode 33 through a drain contact hole 71.

As described above, in the conventional method for manufacturing the LCD, the gate pads and the source pads are connected to the shorting bar in order to anodize them easily. Once anodization has occurred, the shorting bar is divided into two parts. A first part connects the source pads, and the second part connects the gate pads. As a result, it is possible to detect errors and disconnects of the source or gate lines.

However, the conventional method has a number of disadvantages. First, it is impossible to detect an error that results when neighboring gate lines or source lines are shorted to each other using this method. Second, at least eight masks are used during the formation of the active panel in the conventional method because of the anodizing step and the cutting step for the dividing the shorting bar. A direct proportion exists between the number of mask steps utilized in the LCD manufacturing process and the deterioration of the LCD quality. Moreover, the patterning process, including the masking steps, generally takes a relatively long time. Therefore, elimination of even one mask step can reduce the cost and increase the production yield of the LCD devices.

SUMMARY OF THE INVENTION

Accordingly, the present invention is directed to an LCD and a method for its manufacture that substantially obviates one or more of the problems due to limitations and disadvantages of the related art.

An object of the present invention is the provision of a manufacturing method for an LCD in which less mask steps are used than in conventional methods.

Another object of the present invention is the provision of a manufacturing method for an LCD in which it is possible to detect an error using a shorting bar when neighboring gate lines or source lines are shorted together.

Additional features and advantages of the present invention will be set forth in the description which follows, and in part will be apparent from the description, or may be learned by practice of the invention. The objectives and other advantages of the invention will be realized and attained by the structure and process particularly pointed out in the written description and claims hereof as well as in the appended drawings.

To achieve these and other advantages and in accordance with the purpose of the present invention, as embodied and broadly described, the method for manufacturing a liquid crystal display device on a substrate includes the steps of forming a gate electrode, a gate line, a gate pad, a source pad, a first gate shorting bar, and a first source shorting bar using a first metal; forming a gate insulation layer, a semiconductor layer, and a doped semiconductor layer by sequentially depositing an insulation material, an intrinsic semiconductor material, and a doped semiconductor material respectively; and forming a source electrode, a source line, a drain electrode, a second gate shorting bar, and a second source shorting bar using a second metal.

In another aspect of the present invention, a method for manufacturing a liquid crystal display device on a substrate includes the steps of forming a first gate line, using a first metal; forming a gate electrode, a second gate line covering the first gate line, a gate pad disposed at an end of the second gate line, a first gate shorting bar connected to the gate pad, a source pad, and a first source shorting bar connecting to the source pad, using a second metal; forming a gate insulation layer by depositing an insulation material, forming a semiconductor layer by sequentially depositing and patterning an intrinsic semiconductor material, and forming a doped semiconductor layer by sequentially depositing and patterning a doped semiconductor material; forming a source electrode, a source line connected to the source electrode, a drain electrode facing the source electrode, a second gate shorting bar, and a second source shorting bar, using a third metal; forming a protection layer using an insulation material; patterning the protection layer to form a drain contact hole over the drain electrode, a gate shorting bar contact hole over the second gate shorting bar, a source line contact hole over an end portion of the source line, and a source shorting bar contact hole over the second source shorting bar, and patterning the protection layer and the gate insulation layer to form a gate contact hole over the gate pad, and a source contact hole over the source pad; and forming a pixel electrode, a gate terminal, and a source terminal, using a transparent conductive material.

In a further aspect of the present invention, the liquid crystal display device includes a substrate; a plurality of gate lines arrayed on the substrate; a gate insulation layer covering the gate lines; a plurality of source lines on the gate insulation layer; a plurality of gate pads, each including a first metal, and disposed respectively at each end of the gate lines, wherein the plurality of gate pads are numbered consecutively from 1 to N with N being a positive integer for identification; a first gate shorting bar connected to the odd-numbered gate pads; a plurality of odd-numbered gate terminals, each including a transparent conductive material, and connected respectively with the odd-numbered gate pads; a second gate shorting bar, including a second metal, disposed on the gate insulation layer and connected to the even-numbered gate pads; and a plurality of even-numbered gate terminals, each including the transparent conductive material, and connected respectively with the even-numbered gate pads and the second gate shorting bar.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 2, including

FIG. 3, including

FIG. 4, including

FIG. 6, including

FIG. 7, including

FIG. 8, including

DETAILED DESCRIPTION OF THE PREFERRED EMBODIMENTS

Reference will now be made in detail to the preferred embodiments of the present invention, examples of which are illustrated in the accompanying drawings.

Figure 1:
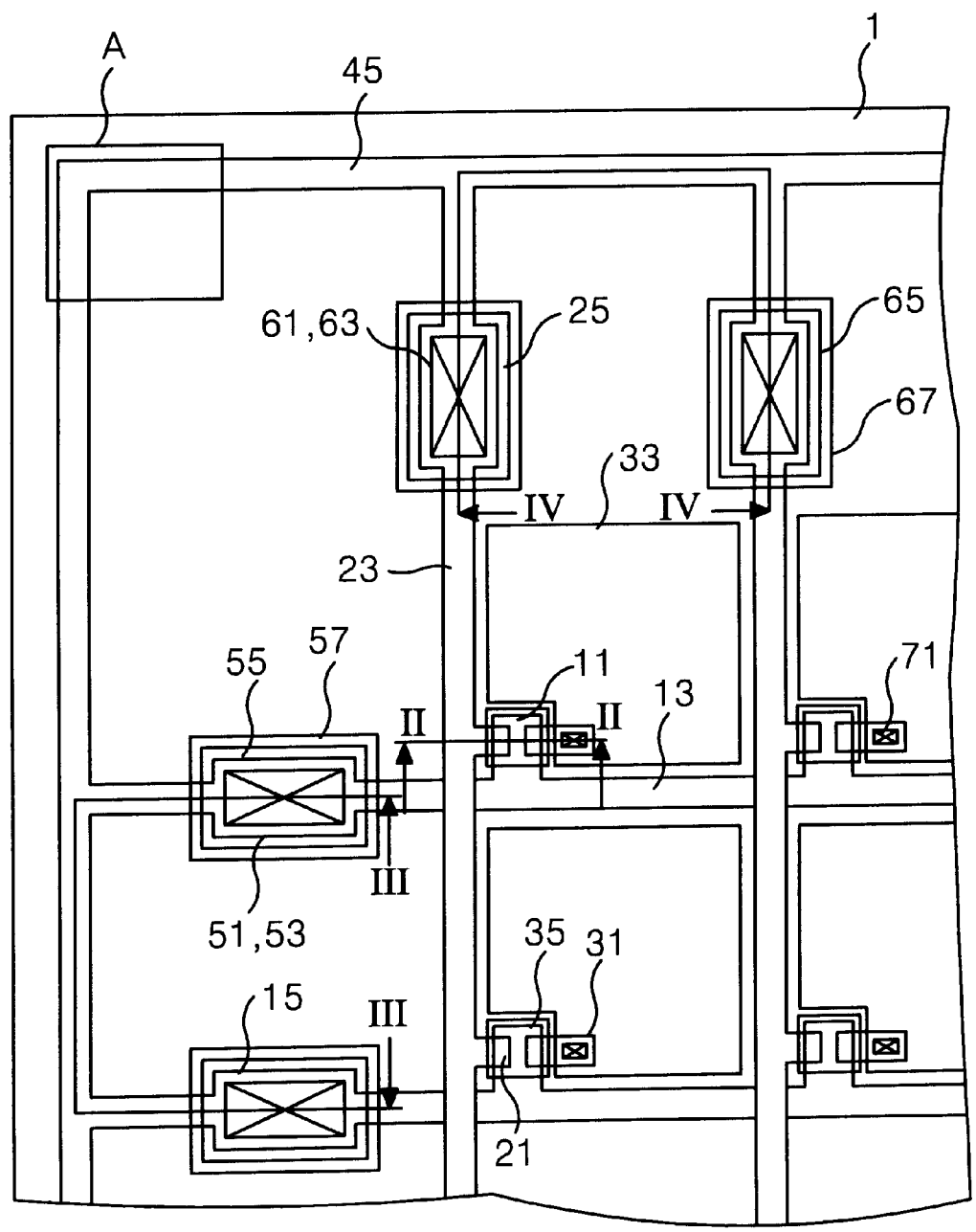
FIG. 1 shows a plan view of the structure of a conventional liquid crystal display device.
Figure 2A:
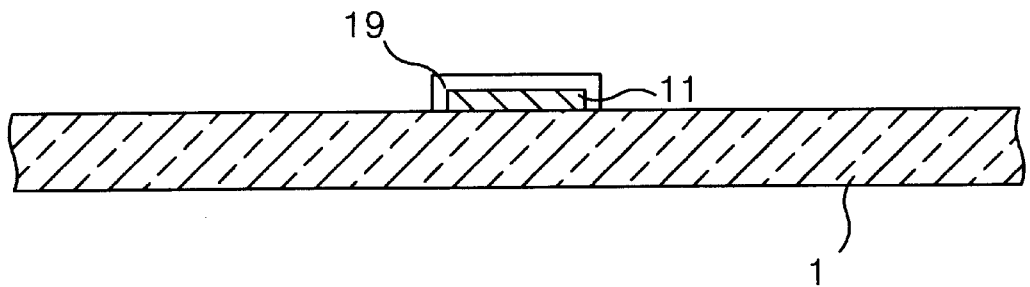
FIGS. 2a–2e, shows a cross sectional view illustrating the manufacturing process at the thin film transistor of the conventional active panel of an LCD.
Figure 2B:
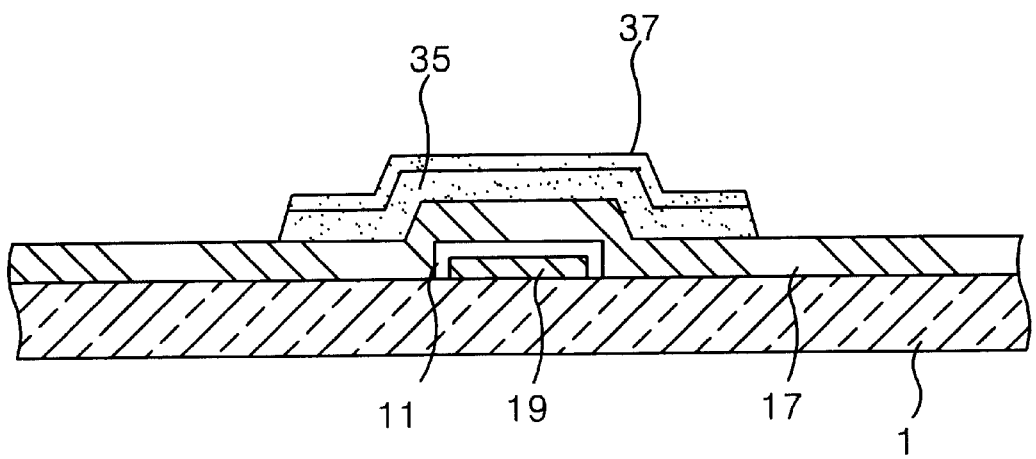
Figure 2C:
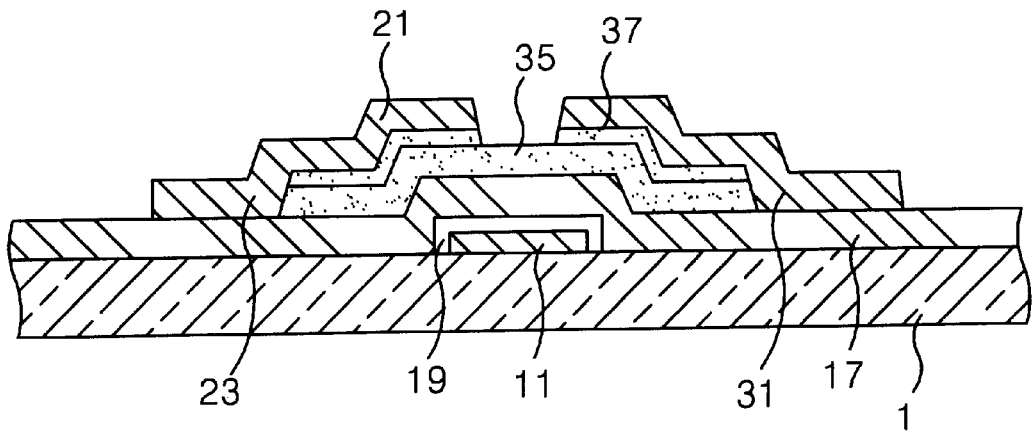
Figure 2D:
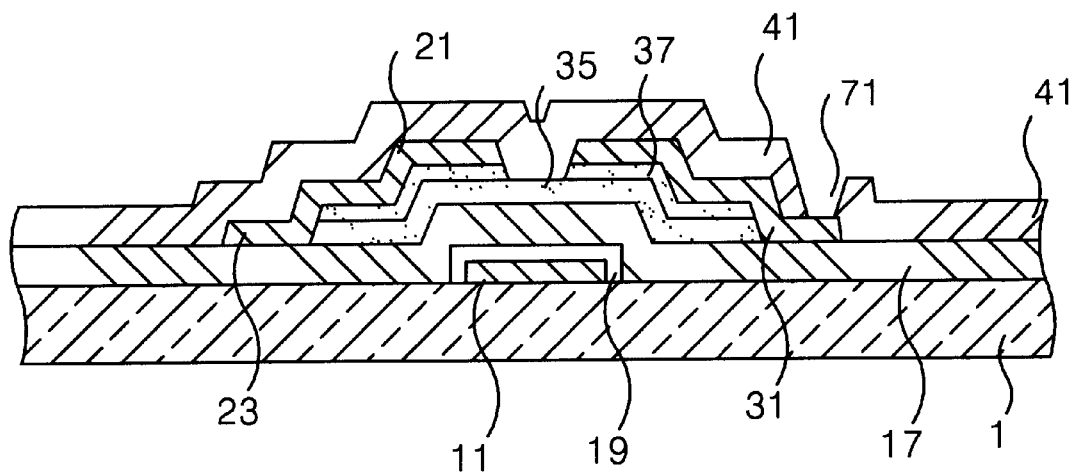
Figure 2E:
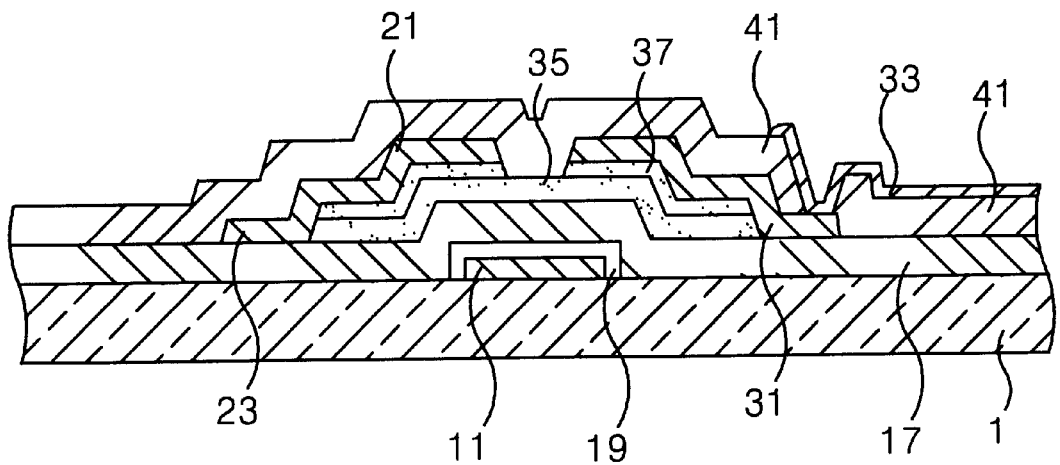
Figure 3A:
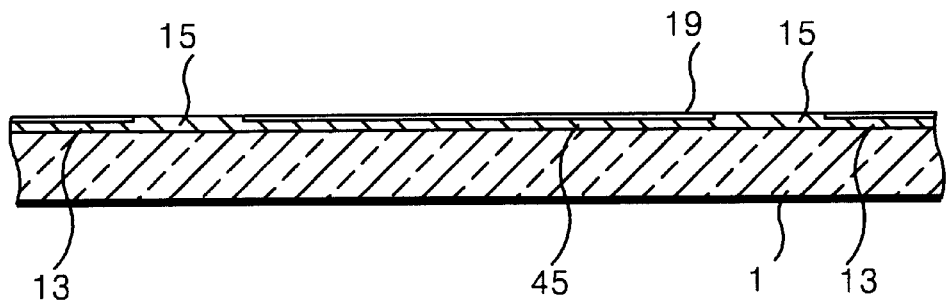
FIGS. 3a–3e, shows a cross sectional view illustrating the manufacturing process at the gate pad and the shorting bar of the conventional active panel of the LCD.
Figure 3B:
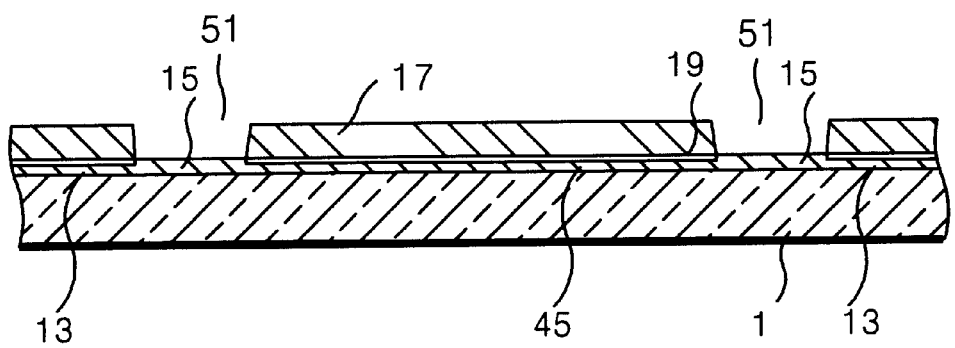
Figure 3C:
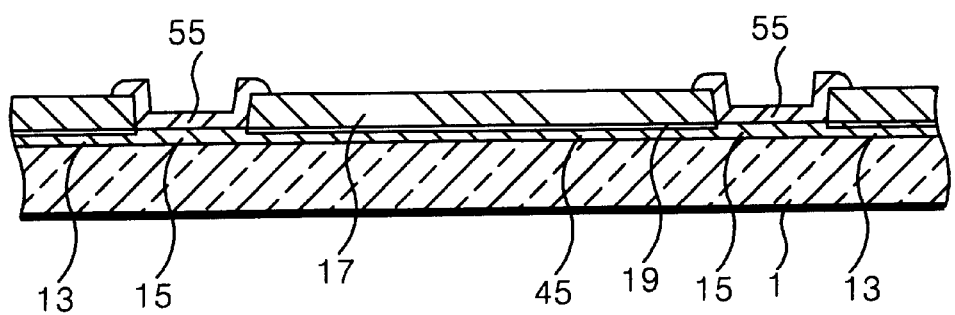
Figure 3D:
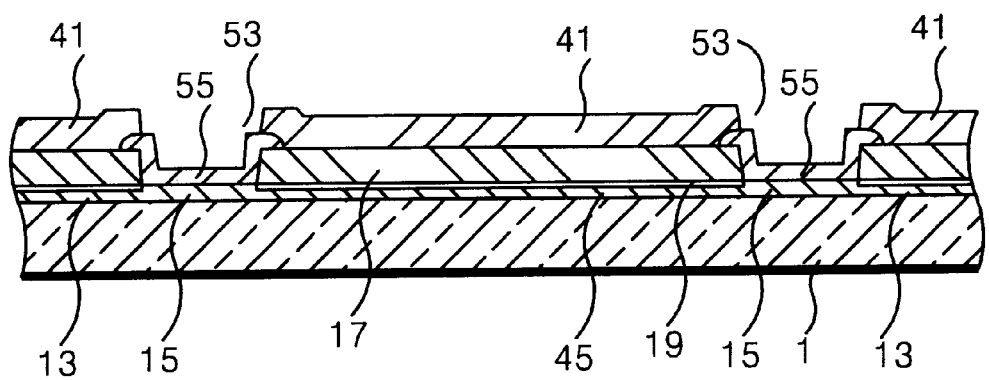
Figure 3E:
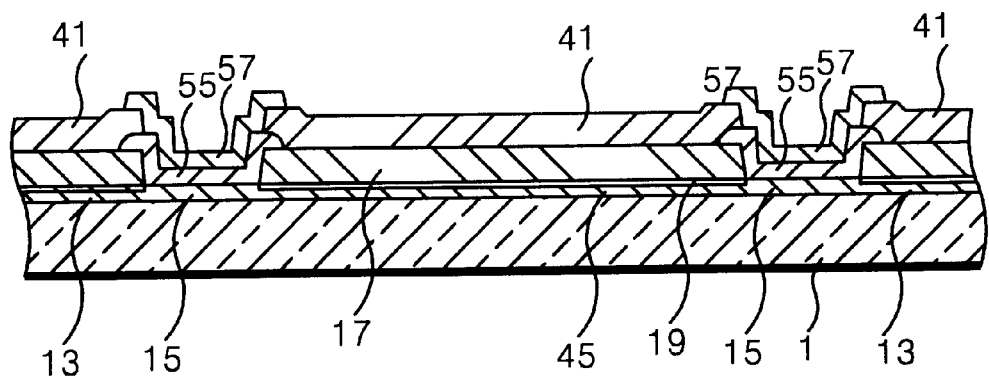
Figure 4A:
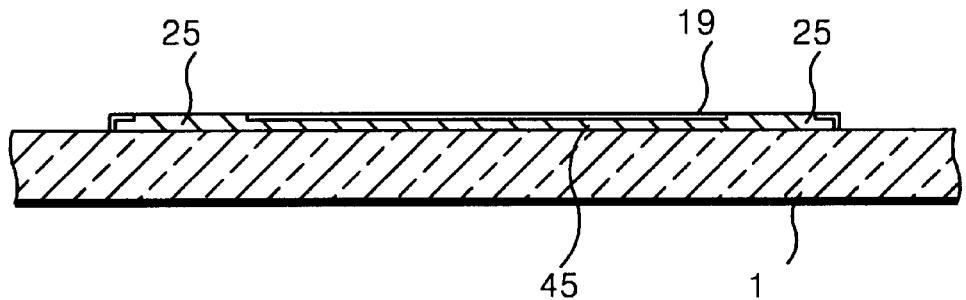
FIGS. 4a–4e, shows a cross sectional view illustrating the manufacturing process at the source pad and the shorting bar in the conventional active panel of the LCD.
Figure 4B:
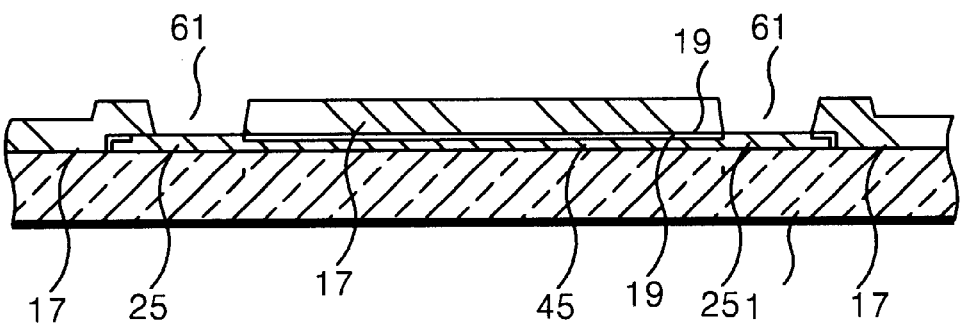
Figure 4C:
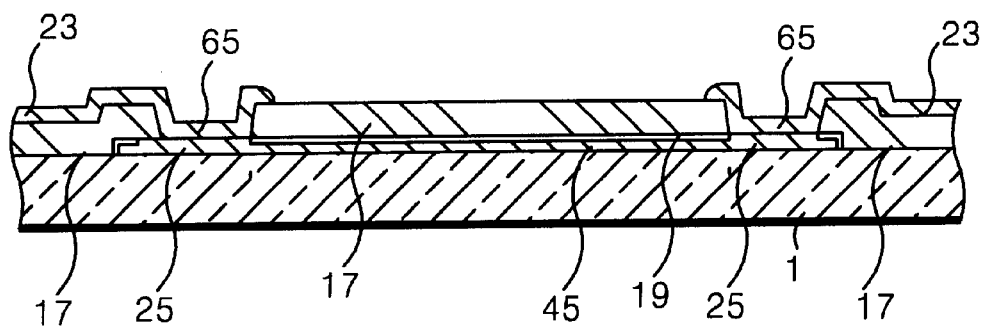
Figure 4D:
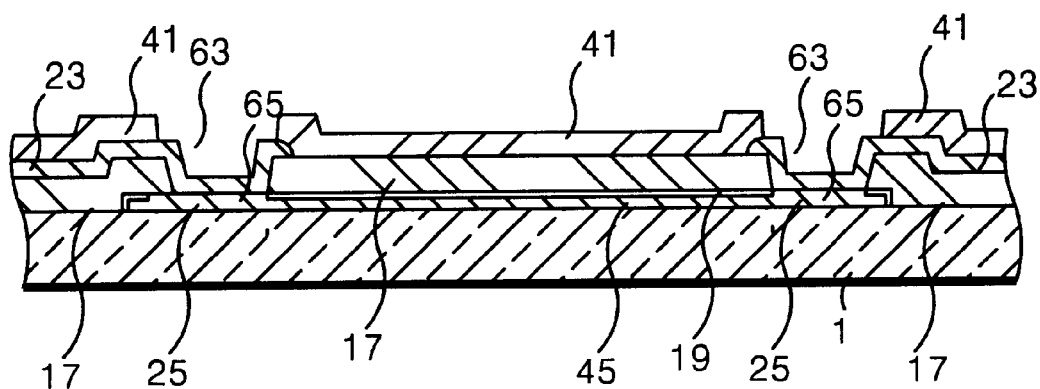
Figure 4E:
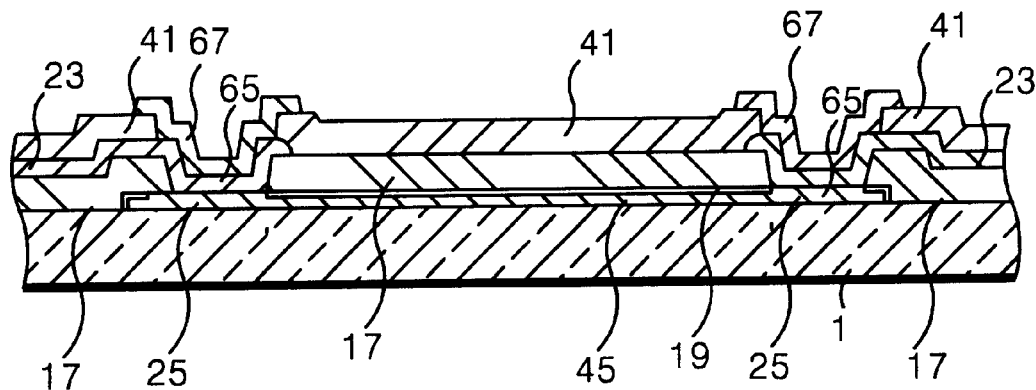
Figure 5:
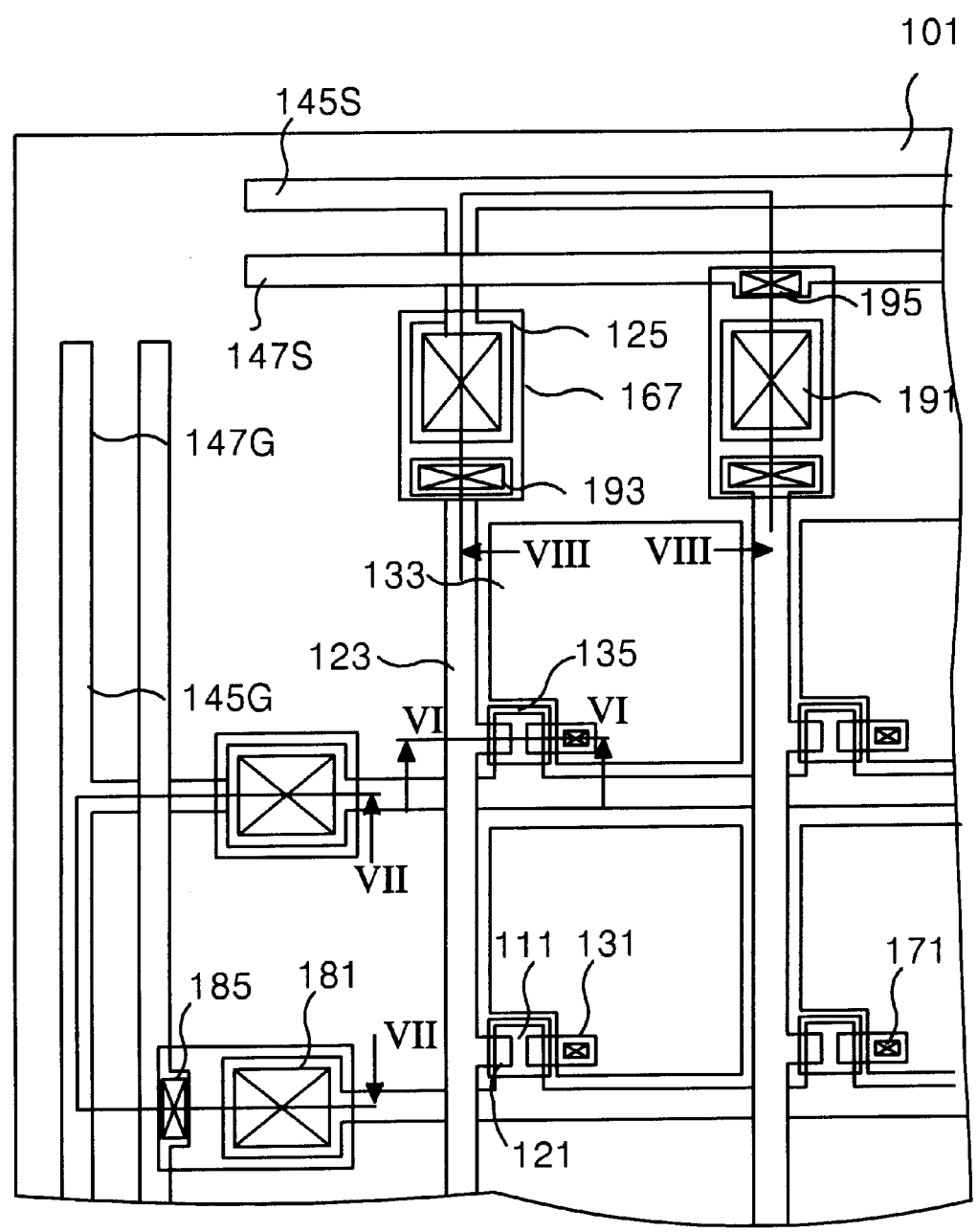
FIG. 5 shows a plan view of the structure of a liquid crystal display device of the present invention.

Referring to the preferred embodiment, the present invention will be explained in detail with reference to FIG. 5, which illustrates the plan view of an LCD; FIGS. 6a–6e, which illustrate the cross sectional views taken along the VI—VI axis in FIG. 5; FIGS. 7a–7d, which illustrate the cross sectional views taken along the VII—VII axis in FIG. 5; and FIGS. 8a–8d, which illustrate the cross sectional views taken along the VIII—VIII axis in FIG. 5.

Figure 6A:
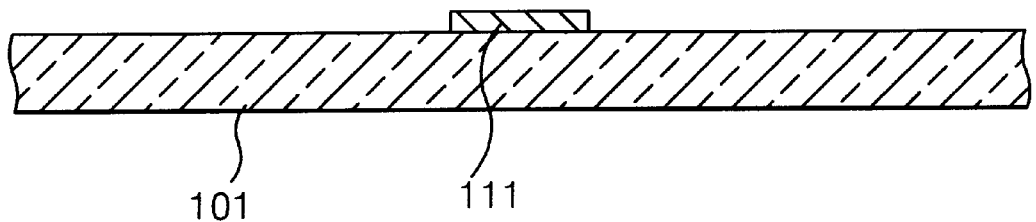
FIGS. 6a–6e, shows a cross sectional view illustrating the manufacturing process at the thin film transistor in an active panel of an LCD according to the present invention.
Figure 7A:
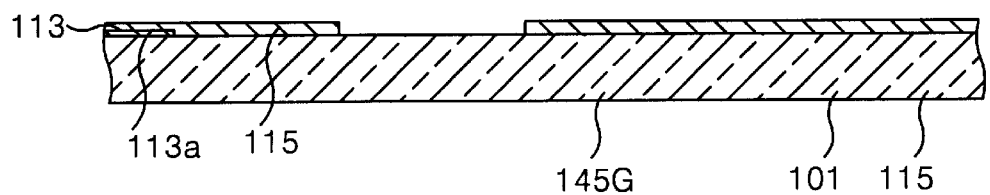
FIGS. 7a–7d, shows a cross sectional view illustrating the manufacturing process at the gate pad and the shorting bar in an active panel according to the present invention.
Figure 8A:
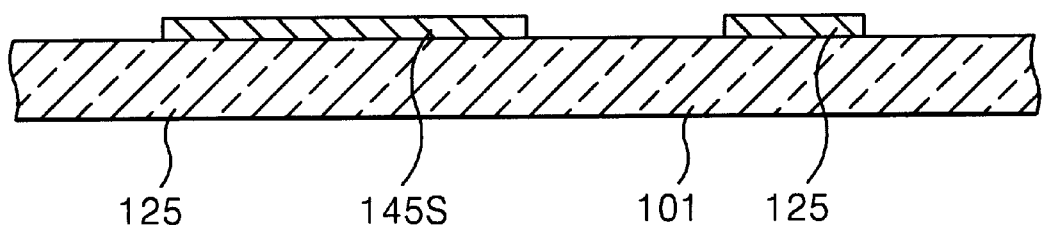
FIGS. 8a–8d, shows a cross sectional view illustrating the manufacturing process at the source pad and the shorting bar in an active panel according to the present invention.

An aluminum (Al) or aluminum alloy layer is vacuum deposited on a transparent glass substrate 101 and patterned by photolithography to form low-resist gate lines 113a on the substrate 101. Next, as shown in FIGS. 6a, 7a and 8a, a metal such as chromium (Cr), molybdenum (Mo), tantalum (Ta) or antimony (Sb) is vacuum deposited on the substrate, including the low-resist gate bus lines 113a, and patterned by using photolithography to form gate electrodes 111, gate lines 113, gate pads 115, a first gate shorting bar 145G, source pads 125, and a first source shorting bar 145S. This eliminates any hillock effect on the aluminum surface. The gate electrodes 111 are arrayed in a matrix pattern and made of one metal layer. The gate lines 113 connect the gate electrodes 111 disposed in a column direction, and cover the low-resist gate lines 113a. The gate pads 115 are respectively disposed at end portions of the respective gate lines 113, and the source pads 125 are respectively disposed at the end portions of the respective source lines, formed later. The gate pads are numbered consecutively from 1 to N with N being a positive integer for identification. The source pads are also numbered consecutively from 1 to N with N being a positive integer for identification. The first gate shorting bar 145G connects the respective gate pads 115 in odd-numbered rows, and the first source shorting bar 145S connects the respective source pads 125 in odd-numbered columns. Nevertheless, the invention need not be limited to this particular embodiment, and other arrangements consistent with the spirit and scope of the present invention are possible. For example, the first gate shorting bar 145G can connect even-numbered gate pads 115 and the first source shorting bar 145S can connect even numbered source pads 125, respectively.

Figure 6B:
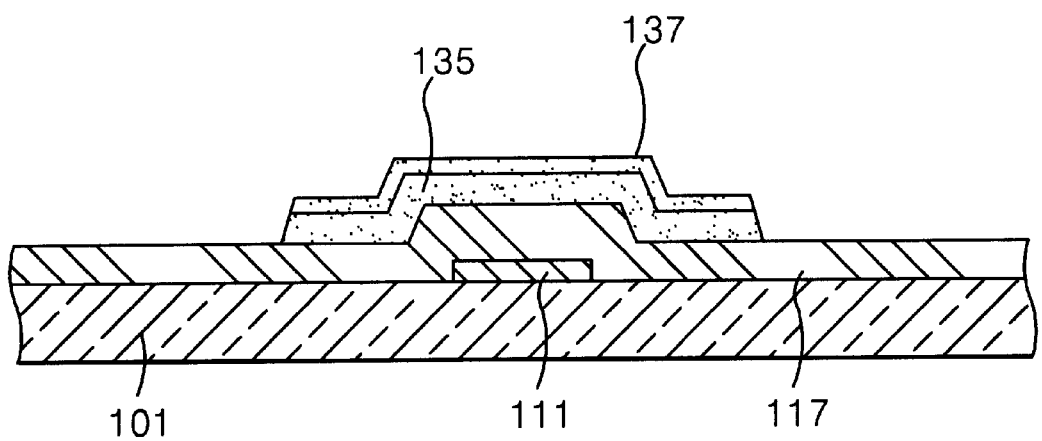

As shown in FIG. 6b, an insulating material, such as silicone oxide or silicone nitride, is vacuum deposited on the resultant surface that includes the gate electrodes 111, the gate lines 113, the gate pads 115, the first gate shorting bar 145G, and the first source shorting bar 145S to form a gate insulating layer 117. An intrinsic semiconductor material and an impure (doped) semiconductor material are vacuum deposited sequentially on the surface of the gate insulating layer 117 and are patterned by using photolithography to form a semiconductor layer 135 and an impure semiconductor layer 137.

Figure 6C:
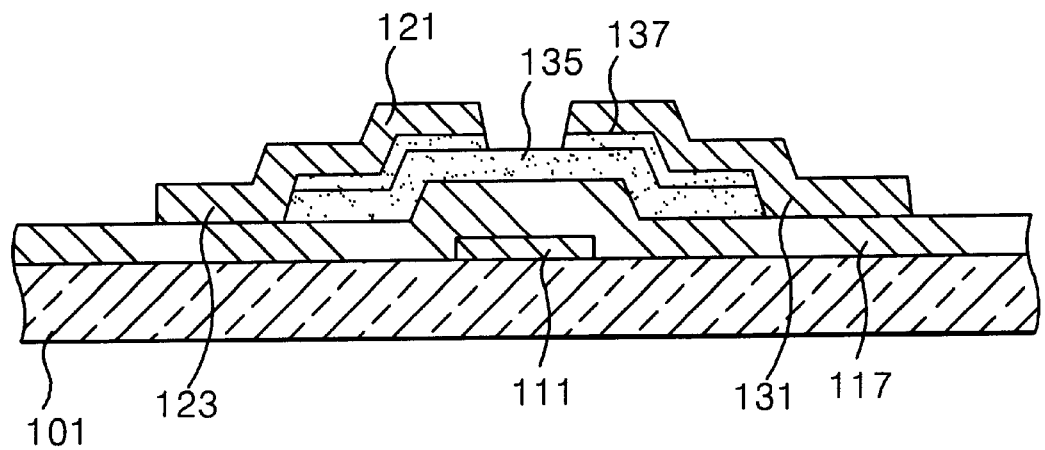
Figure 7B:
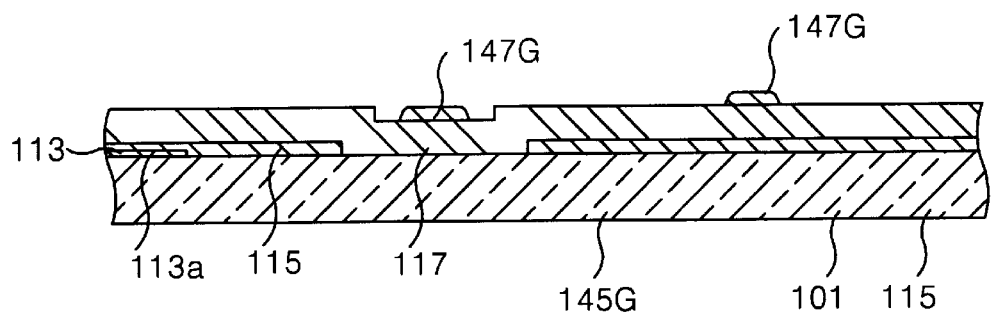
Figure 8B:
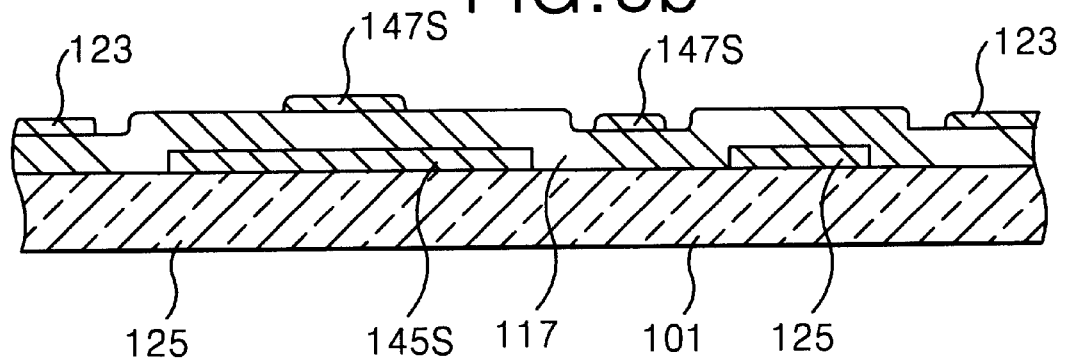

As shown in FIGS. 6c, 7b, and 8b, chromium or a chromium alloy is vacuum deposited on the insulating layer 117 including the semiconductor layer 135 and the impure semiconductor layer 137, and patterned by using photolithography to form source electrodes 121, drain electrodes 131, source lines 123, a second gate shorting bar 147G, and a second source shorting bar 147S. The source electrodes 121 and drain electrodes 131 are formed at opposite positions, respectively, over the gate electrodes 111. The source lines 123 connect the source electrodes 121, which are arrayed in a column direction. The end portion of the source lines 123 need to be wider than the other portions in order to form a suitable source line contact hole. The second gate shorting bar 147G requires a portion that is wider than its other portions at the accordance with the gate pads 115 in even rows, in order to form a suitable gate shorting bar contact hole. Similarly, the second source shorting bar 147S must also have a portion that is wider than the rest of the bar at the accordance with the source pads 125 in even columns. Here, if the first shorting bars 145 (145G and 145S) are connected to the even-numbered rows and columns, respectively, then the second shorting bar 147 (147G and 147S) are connected to the odd-numbered row and columns, respectively. Subsequently, using the source electrodes 121 and the drain electrodes 131 as masks, the exposed portion of the impure semiconductor layer 137 between the source electrodes 121 and the drain electrodes 131 is removed.

Figure 6D:
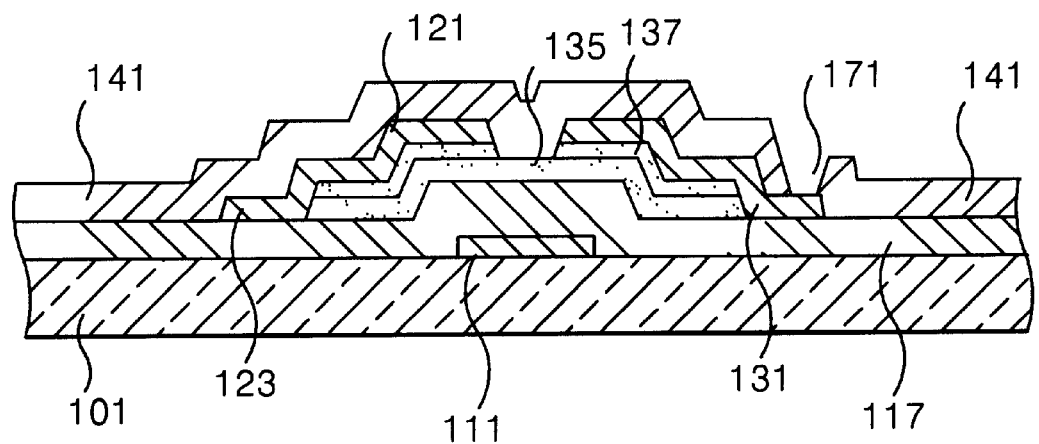
Figure 7C:
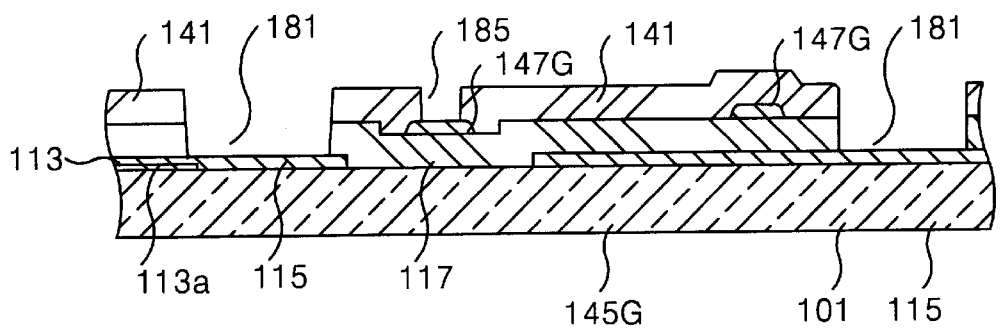
Figure 8C:
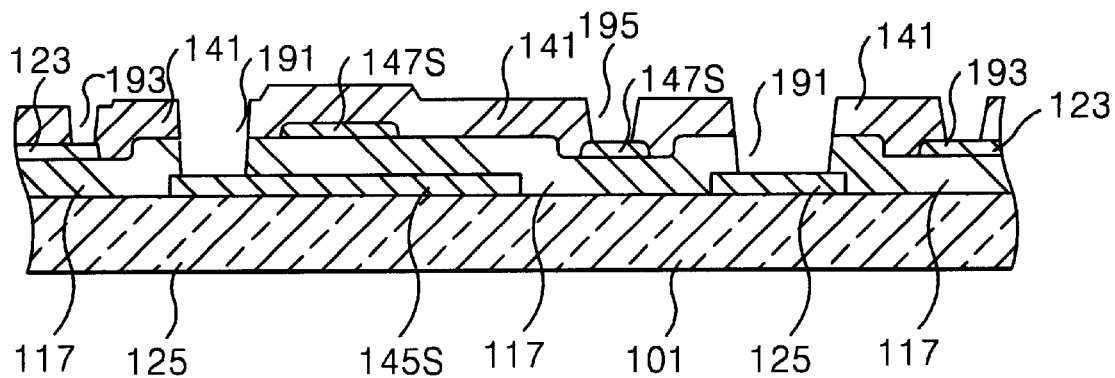

As shown in FIGS. 6d, 7c and 8c, an insulating material, such as silicone nitride or silicone oxide, is vacuum deposited on the surface that includes the source electrodes 121, the source lines 123, drain electrodes 131, and the second shorting bars 147 to form a protection layer 141. This protection layer 141 and the gate insulating layer 117 are then patterned by using photolithography to form a gate contact hole 181 over the gate pad 115 and a source contact hole 191 over the source pad 125. The protection layer 141 over the drain electrode is removed to form a drain contact hole 171. At the same time, the protection layer 141 over the end portion of the source line 123 is removed to form a source line contact hole 193 for connecting to a source terminal to be formed later. Additionally, the protection layer 141 over the second shorting bar 147 is removed to form a gate shorting bar contact hole 185 and a source shorting bar contact hole 195 for contacting to respective terminals to be formed later.

Figure 6E:
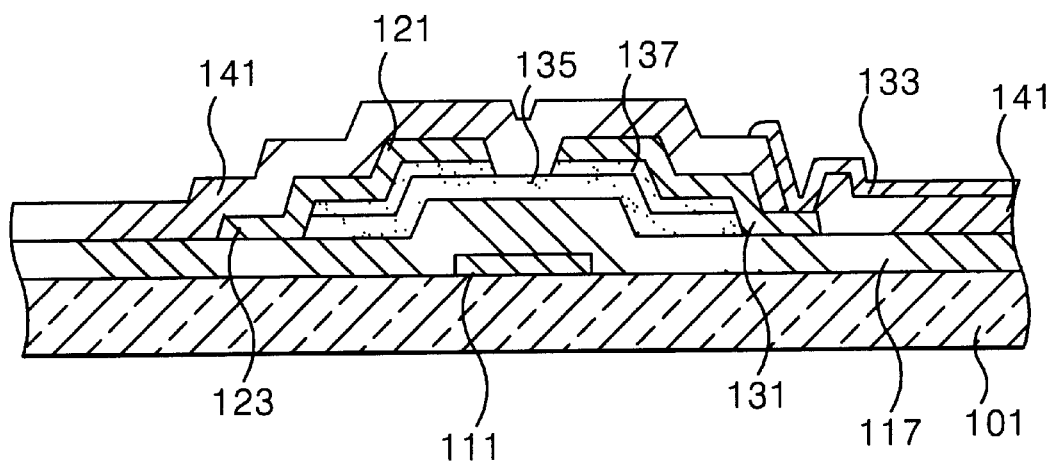
Figure 7D:
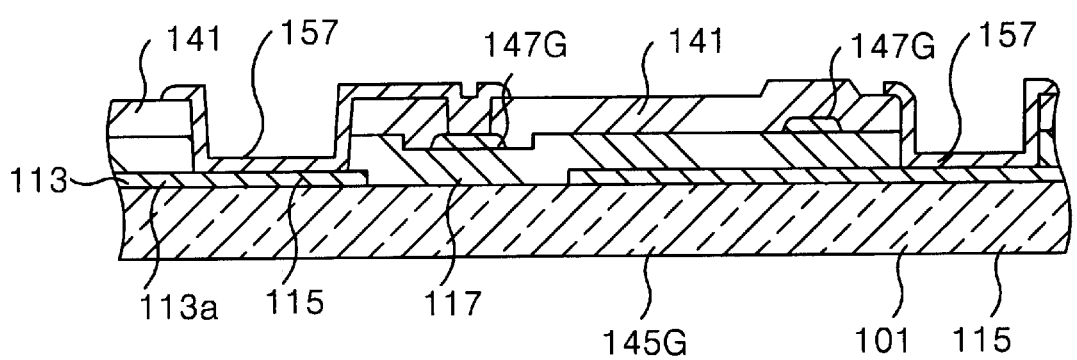
Figure 8D:
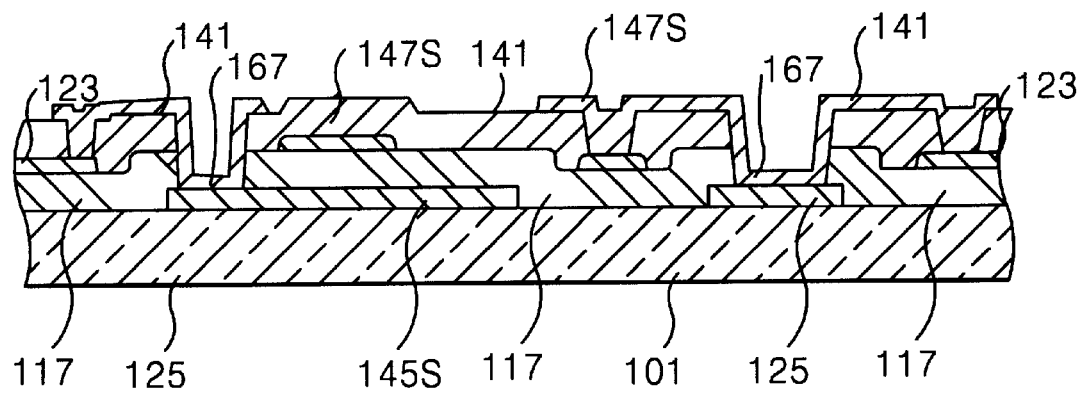

As shown in FIGS. 6e, 7d and 8d, a transparent conductive material, such as an indium-tin oxide (ITO), is vacuum deposited on the entire resultant surface including the protection layer 141 and patterned by using photolithography to form pixel electrodes 133, gate terminals 157 and source terminals 167. The pixel electrodes 133 are connected with respective drain electrodes 131 through the drain contact holes 171. The gate terminals 157 in odd rows are connected to the gate pads 115 connected with the first gate shorting bar 145G through respective gate contact holes 181. The gate terminals in even rows are connected to the second gate shorting bar 147G through respective gate shorting bar contact holes 185, and the gate pads 115 in even rows through respective gate contact holes 181. At the same time, the source terminals 167 in odd columns are connected to respective source pads 125 connected with the first source shorting bar 145S through respective source contact holes 191, and the source lines 123 in odd columns through respective source line contact holes 193. The source terminals in even columns are connected to the second shorting bar 147S through respective source shorting bar contact holes 195, the source lines 123 in even columns through respective source contact holes 191, and the source pad 125 through respective source line contact holes 193. Nevertheless, the invention need not be limited to this particular embodiment, and other arrangements consistent with the spirit and scope of the present invention are possible. For example, if the first shorting bars 145 (145S and 145G) are connected with the pads in even rows and columns, then the second shorting bars 147 (147S and 147G) are connected with the pads in odd rows and columns.

The present invention thus relates to a method for manufacturing an LCD device in which a probing shorting bar is integrally formed with the active panel of an LCD. In the present invention, the shorting bar for detecting an error is divided into two kinds, which are formed in two separate layers. The first kind is for connecting to odd-numbered pads and the other is for connecting to even-numbered pads. Therefore, it is possible to detect a shorting error when neighboring lines are shorted to each other. Furthermore, the structure of the pads is simplified, because the pad part comprises a pad metal and a terminal including ITO. And the process for manufacturing the LCD is simplified because the present invention does not include an anodizing step to prevent a hillock from growing on the substrate.

The present invention relates to a method for manufacturing the active panel in an LCD in which an aluminum layer is covered by a metal such as chromium (Cr), molybdenum (Mo), tantalum (Ta) or antimony (Sb) to prevent a hillock from growing. While prior solutions to the hillock problem included anodizing the surface of the aluminum (Al) layer, the method of the instant invention results in a reduction in the number of mask processes by eliminating the mask processes for anodizing and for forming contact holes. Thus, the manufacturing process is simplified by the instant invention. As a result, the error rates that come from misalignment during the mask process are reduced. Moreover, production yields are improved and the tact time is shortened.

Furthermore, the shorting bars for detecting an error in the gate and the source lines are divided into two kinds. A first is for the odd lines, the second is for the even lines. As a result, the shorting bar can detect the shorting errors when neighboring lines are shorted by each other. Consequently, the present invention suggests a manufacturing method in which the manufacturing process is simplified and enhanced error detection elements are provided.

It will be apparent to those skilled in the art that various changes and modifications can be made in the liquid crystal display device or the present invention without departing from the spirit and scope thereof. Thus, it is intended that the present invention cover the modifications and variations of this invention provided they come within the scope of the appended claims and their equivalents.

What is claimed is:

1. A method for manufacturing a liquid crystal display device on a substrate comprising the steps of:

forming a gate electrode, a gate line, a gate pad, a source pad, a first gate shorting bar, and a first source shorting bar using a first metal;

forming a gate insulation layer, a semiconductor layer, and a doped semiconductor layer by sequentially depositing an insulation material, an intrinsic semiconductor material, and a doped semiconductor material, respectively; and forming a source electrode, a source line, a drain electrode, a second gate shorting bar, and a second source shorting bar using a second metal.

2. The method for manufacturing a liquid crystal display according to claim 1, further comprising the steps of:

forming a protection layer using an insulation material on the substrate including the source electrode;

forming a variety of contact holes including a gate contact hole over the gate pad, a source contact hole over the source pad, a gate shorting bar contact hole over the second gate shorting bar, and a source shorting bar contact hole over the second source shorting bar by patterning the protection layer, and forming a gate terminal and a source terminal using a transparent conductive material on the substrate including the gate contact hole and the source contact hole.

3. The method for manufacturing a liquid crystal display device according to claim 2, wherein the step of forming the variety of contact holes further includes forming a drain contact hole over the drain electrode, and wherein the step of forming a gate terminal and a source terminal further includes the forming of a pixel electrode connected to the drain electrode.

4. The method for manufacturing a liquid crystal display device according to claim 1, wherein the first gate shorting bar connects respective gate pads in odd-numbered rows, and the second gate shorting bar connects respective gate pads in even-numbered rows.

5. The method for manufacturing a liquid crystal display device according to claim 1, wherein the first gate shorting bar connects respective gate pads in even-numbered rows, and the second gate shorting bar connects respective gate pads in odd-numbered rows.

6. The method for manufacturing a liquid crystal display device according to claim 1, wherein the first source shorting bar connects respective source pads in odd-numbered columns, and the second source shorting bar connects respective source pads in even-numbered columns.

7. The method for manufacturing a liquid crystal display device according to claim 1, wherein the first source shorting bar connects respective source pads in even-numbered columns, and the second source shorting bar connects respective source pads in odd-numbered columns.

8. A method for manufacturing a liquid crystal display device on a substrate comprising the steps of:

forming a first gate line, using a first metal;

forming a gate electrode, a second gate line covering the first gate line, a gate pad disposed at an end of the second gate line, a first gate shorting bar connected to the gate pad, a source pad, and a first source shorting bar connecting to the source pad, using a second metal;

forming a gate insulation layer by depositing an insulation material, forming a semiconductor layer by sequentially depositing and patterning an intrinsic semiconductor material, and forming a doped semiconductor layer by sequentially depositing and patterning a doped semiconductor material;

forming a source electrode, a source line connected to the source electrode, a drain electrode facing the source electrode, a second gate shorting bar, and a second source shorting bar, using a third metal;

forming a protection layer using an insulation material;

patterning the protection layer to form a drain contact hole over the drain electrode, a gate shorting bar contact hole over the second gate shorting bar, a source line contact hole over an end portion of the source line, and a source shorting bar contact hole over the second source shorting bar, and patterning the protection layer and the gate insulation layer to form a gate contact hole over the gate pad, and a source contact hole over the source pad; and forming a pixel electrode, a gate terminal, and a source terminal, using a transparent conductive material.

9. The method for manufacturing a liquid crystal display device according to claim 8, wherein the first gate shorting bar connects to respective gate pads in odd-numbered rows, and the second gate shorting bar connects to respective gate pads in even-numbered rows.

10. The method for manufacturing a liquid crystal display device according to claim 8, wherein the first gate shorting bar connects to respective gate pads in even-numbered rows, and the second gate shorting bar connects to respective gate pads in odd-numbered rows.

11. The method for manufacturing a liquid crystal display device according to claim 8, wherein the first source shorting bar connects to respective source pads in odd-numbered columns, and the second source shorting bar connects to respective source pads in even-numbered columns.

12. The method for manufacturing a liquid crystal display device according to claim 8, wherein the first source shorting bar connects to respective source pads in even-numbered columns, and the second source shorting bar connects to respective source pads in odd-numbered columns.

13. A liquid crystal display device comprising:

a substrate;

a plurality of gate lines arrayed on the substrate;

a gate insulation layer covering the gate lines;

a plurality of source lines on the gate insulation layer;

a plurality of gate pads, each including a first metal and disposed respectively at each end of the gate lines, wherein the plurality of gate pads are numbered consecutively from 1 to N with N being a positive integer for identification;

a first gate shorting bar including said first metal, and connected to the odd-numbered gate pads;

a plurality of odd-numbered gate terminals, each including a transparent conductive material, and connected respectively with the odd-numbered gate pads;

a second gate shorting bar, including a second metal, disposed on the gate insulation layer and connected to the even-numbered gate pads; and a plurality of even-numbered gate terminals, each including the transparent conductive material, and connected respectively with the even-numbered gate pads and the second gate shorting bar.

14. The liquid crystal display device according to the claim 13, further comprising:

a plurality of source pads, each including the first metal, and one of the plurality of source pads being disposed respectively at the end of each of the plurality of source lines;

a first source shorting bar including the first metal, and connected to the odd-numbered source pads;

a plurality of odd-numbered source terminals including the transparent conductive material, and connected respectively to the odd-numbered source pads;

a second source shorting bar, including the second metal, formed on the gate insulation layer; and a plurality of even-numbered source terminals including the transparent conductive material, and connected respectively to the even-numbered source pads and to the second source shorting bar.

15. The liquid crystal display device according to claim 14, further comprising a doped semiconductor layer provided between the gate insulation layer and the plurality of source lines.

* * * * *